(12) United States Patent
Friedrich et al.

(10) Patent No.: US 6,786,540 B2
(45) Date of Patent: Sep. 7, 2004

(54) DRIVE DEVICE FOR MOTOR VEHICLE SLIDING SUNROOFS

(75) Inventors: Norbert Friedrich, Wehrheim (DE); Rainer Hattass, Grundau (DE)

(73) Assignee: ArvinMeritor GmbH, Dietzenbach (DE)

( * ) Notice: Subject to any disclaimer, the term of this patent is extended or adjusted under 35 U.S.C. 154(b) by 0 days.

(21) Appl. No.: 10/350,896

(22) Filed: Jan. 24, 2003

(65) Prior Publication Data

US 2003/0141749 A1 Jul. 31, 2003

(30) Foreign Application Priority Data

Jan. 31, 2002 (DE) .......................................... 102 03 904

(51) Int. Cl.[7] .............................................. K60J 7/057
(52) U.S. Cl. ....................................................... 296/223
(58) Field of Search ................................ 296/219, 223, 296/216.04

(56) References Cited

U.S. PATENT DOCUMENTS 4,835,449 A * 5/1989 Huehn ......................... 296/223
5,069,502 A * 12/1991 Sekine et al. ............... 296/223
6,345,860 B1 * 2/2002 Adam et al. ................. 296/223

FOREIGN PATENT DOCUMENTS

| DE | 4204624 C1 | | 4/1993 | |
|---|---|---|---|---|
| EP | 368405 | * | 5/1980 | .................. 296/223 |
| FR | 71024 | * | 6/1931 | .................. 296/219 |
| GB | 263146 | * | 8/1927 | .................. 296/223 |
| GB | 293957 | * | 7/1928 | .................. 296/223 |
| GB | 334113 | * | 8/1930 | .................. 296/223 |

* cited by examiner

*Primary Examiner*—Dennis H. Pedder
(74) *Attorney, Agent, or Firm*—Carlson, Gaskey & Olds

(57) ABSTRACT

Various embodiments of a drive device for motor vehicle sliding sunroofs or the like are proposed, in which the drive cables wound with wire in screw thread-like manner used hitherto as drive transmission elements in particular for the drive of the displaceable cover but also for the drive of displaceable shading or wind deflection elements are replaced by endless, tensile stress-resistant, low-noise guided toothed belts.

19 Claims, 7 Drawing Sheets

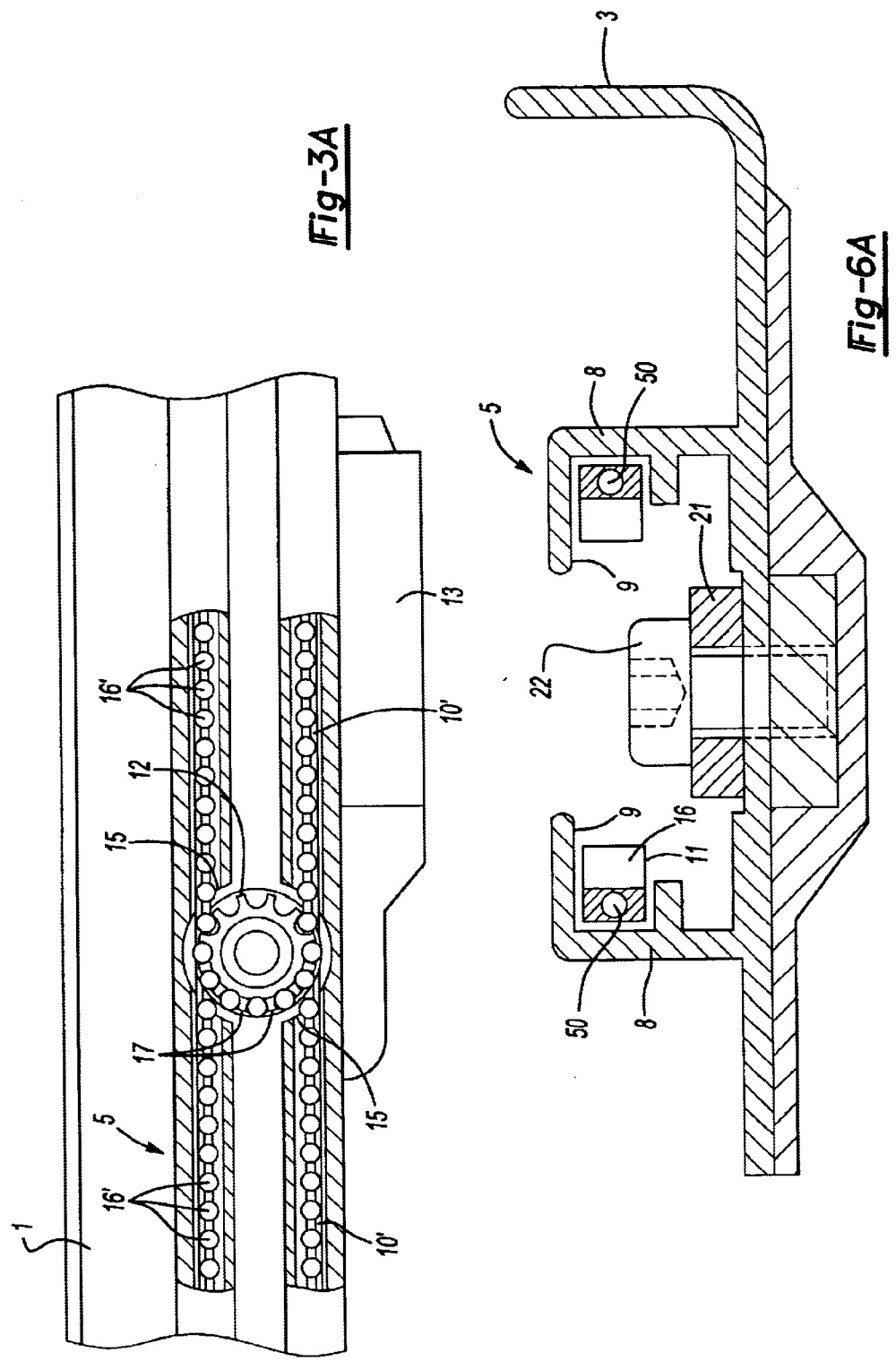

FIG. 6
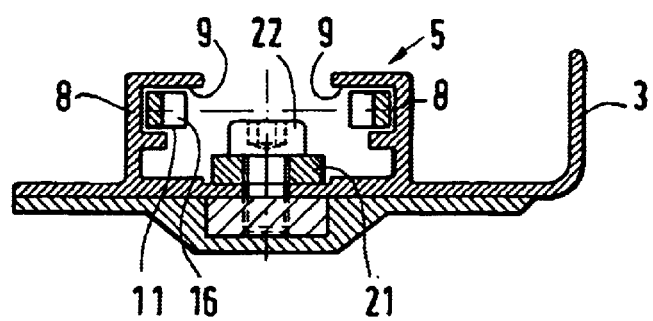
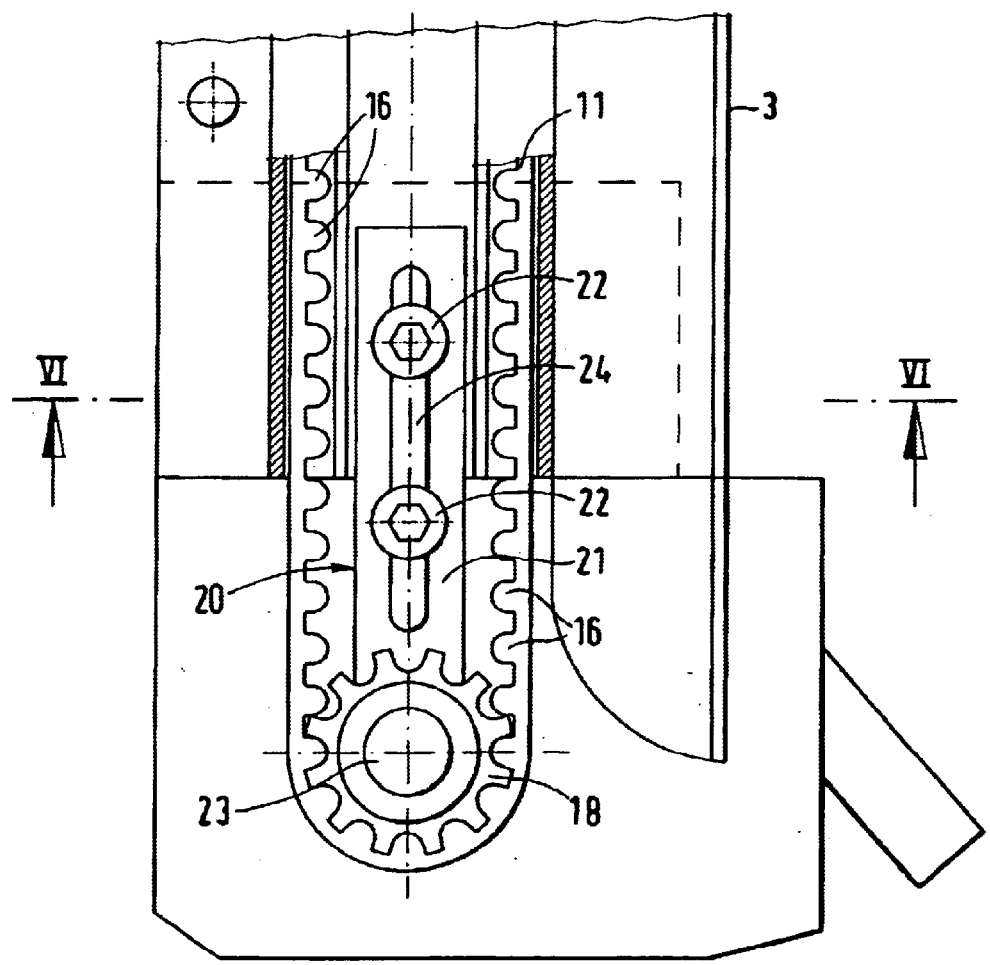
FIG. 5

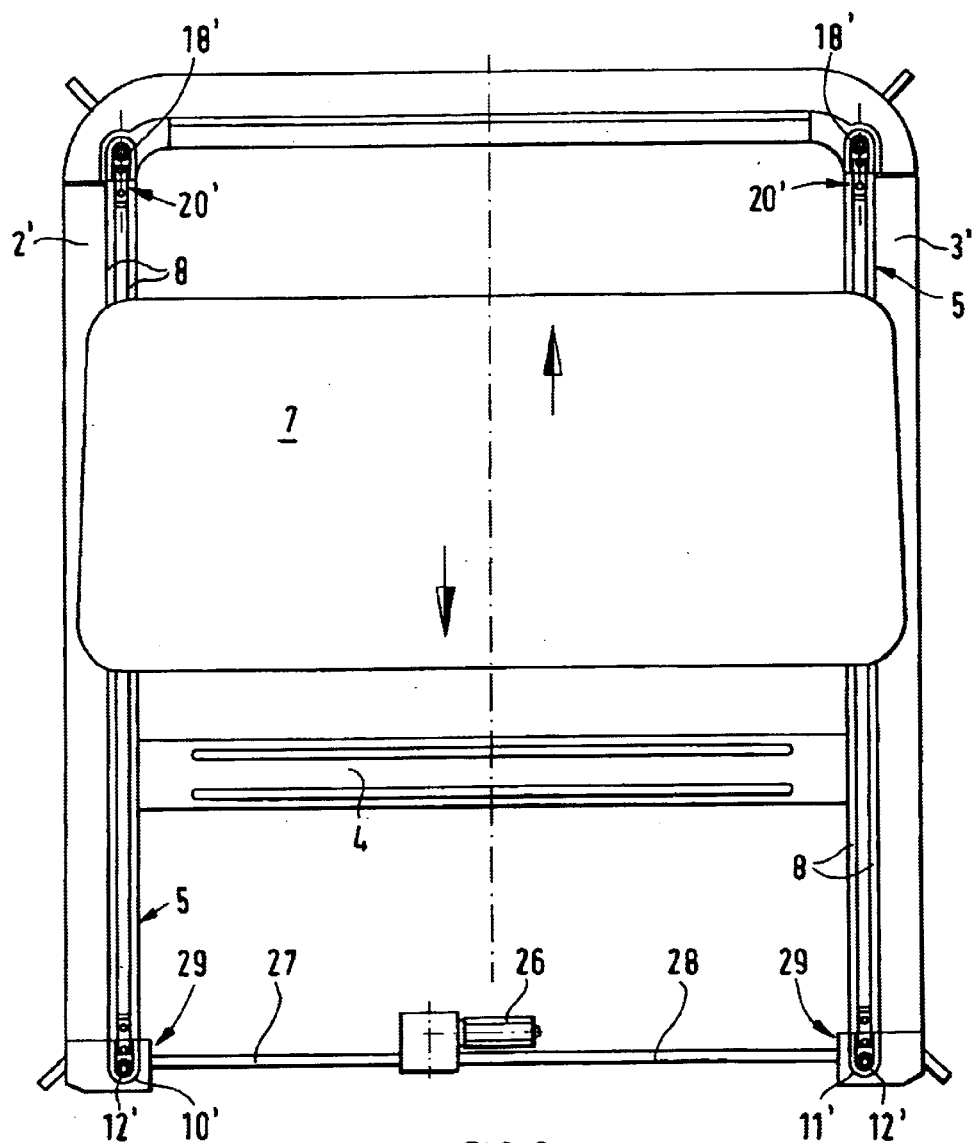

DRIVE DEVICE FOR MOTOR VEHICLE SLIDING SUNROOFS

BACKGROUND OF THE INVENTION

The invention relates to a drive device for motor vehicle sliding sunroofs, having two flexible drive transmission elements which are in driving connection, one on one side and the other on an opposite side of a displaceable element that is displaceable in one direction or another direction of movement, in the form of a cover of the sliding sunroof construction, with guide components for the displaceable element, and which may be synchronously displaced in the one or the other direction of movement by engagement with a rotatable toothed pinion, which may be selectively driven in one or another direction of rotation.

The term "motor vehicle sliding sunroof" or "sliding sunroof", used alone or in phrases, is intended, for the purposes of the present invention, to cover all designs in which at least one cover is associated displaceably with a roof opening of a motor vehicle and is movable by means of the drive device. These include designs in which the cover may be slid under the fixed rear roof surface to uncover the roof opening after lowering of its rear edge and also slide and lift sunroofs, in which the cover may additionally be tilted from its position closing the roof opening about a tilt axis provided in the vicinity of its front edge so as to project above the fixed roof surface. Finally, this definition is also intended to cover those designs in which the cover may be displaced more or less to the rear over the fixed rear roof surface after lifting of its rear edge ("spoiler roofs"). Roof designs are also included in which at least one cover is made not of sheet metal or glass but as a folding roof of flexible surface material.

DESCRIPTION OF THE PRIOR ART

Common to all the known drive devices of the above-mentioned type (e.g. DE 38 03 816 A1, DE 38 09 949 A1, DE 195 31 514 C1, DE 32 21 487 A1) is that the two flexible drive transmission elements are drive cables consisting of a stranded flexible core of steel wires, onto which a "working winding" of a steel wire of circular cross section is firmly wound in the manner of a helix. The pinion located stationarily on the sliding sunroof construction and driven via a crank handle transmission or an electric gear motor engages with its toothing directly in the working windings of both drive cables in the manner of a rack drive. The drive cables are guided displaceably in tensile stress- and compression-resistant manner in guide channels and/or guide tubes and transmit the adjusting and actuating movements to the guide components of the cover, with which they are in driving connection.

These drive devices with drive cables as drive transmission elements, which have been known for a long time and used on a large scale, have been constantly further developed and have definite advantages but also design-dependent disadvantages. For instance, an ideal tooth shape on the pinion, which would correspond to a normal optimised toothed gear, cannot be achieved because of the circular cross-sectional circumference of the wire working winding and the unavoidable dimensional tolerances with regard to the drive cable, the pinion itself and the guide elements for the drive cables. Moreover, it cannot be ensured that there is always at least one tooth of the pinion engaged with each of the two drive cables, resulting in jerky, uneven advance of the drive cables. At the same time, the active circle of the pinion changes due to play in the tooth engagement movement, and also due to resilient deflection movements of the drive cables. As a consequence, when the known drive devices are actuated, vibrations may be excited which are transmittable to the frame structure of the sliding sunroof and thus to the vehicle roof itself, whereby disturbing noise may develop during adjusting and driving movements of the sliding sunroof, especially when the pinion is driven by an electric motor. Due to the inevitable contact between the working winding and the walls of the guide elements for the drive cables, disturbing scraping noises and increased material abrasion at the corner radii of the cable guides may arise during adjusting and driving movements. Finally, it should also be mentioned that the manufacturing method for the drive cables is relatively complex, such that the drive cables have a considerable effect on the cost of the known drive devices.

SUMMARY OF THE INVENTION

The object of the invention is to provide a drive device of the above-mentioned type, which allows even, low-noise adjusting and driving movements of the drive transmission elements to be achieved without vibration excitation while keeping the design of the drive device simple and economic.

According to the present invention, there is provided a drive device for motor vehicle sliding sunroofs, having two flexible drive transmission elements which are in driving connection, one on one side and the other on an opposite side of a displaceable element that is displaceable in one direction or another direction of movement, in the form of a cover of the sliding sunroof construction, with guide components for the displaceable element, and which may be synchronously displaced in the one or the other direction of movement by engagement with a rotatable toothed pinion, which may be selectively driven in one or another direction of rotation; wherein the two flexible drive transmission elements take the form of endless, tensile stress-resistant toothed belts, which are provided on an inside thereof with internal toothing complementary to the toothing of the pinion, wherein deflection of the two toothed belts takes place at one end in each case with partial wrap of the pinion and at the other end in each case by means of a deflection element.

The use according to the invention of endless toothed belts as drive transmission elements allows the avoidance of all the cited disadvantages of drive cables. The endless toothed belts transmit only tensile forces to the guiding and adjusting components located on each side of the cover. The toothed belts have a continuous force profile, such that driving engagement may be achieved at any point apart from the deflection points of the toothed belts, wherein driving engagement for the guiding and adjusting components each side of the cover is intended to be effected at toothed belt portions moving in the same direction. Due to the partial angle of wrap of the toothed belt, which amounts preferably to 180° of the pinion circumference, a plurality of pinion teeth are always engaged with toothed belt teeth, such that no noise-generating influences may result from the tooth engagement situation.

Where "endless" toothed belts are mentioned herein, the term naturally includes those toothed belts which are produced to start with as toothed belt pieces of the desired total length or are cut to length, their two ends optionally being joined together in a suitable manner to form an endless toothed belt after installation on the drive device.

The internal toothing of the toothed belts and the pinion is advantageously spur toothing, so optimising tooth engagement. If the tooth flanks on both sides are constructed appropriately, virtually play-free tooth engagement may be achieved.

To reduce friction in the drive system, the deflection elements are advantageously constructed as deflection rollers mounted rotatably on the sliding sunroof construction, which deflection rollers may, in the event of corresponding guidance of the toothed belts, correspond in thickness approximately to the toothed belt width, i.e. they may be simply disk-shaped in the interests of keeping the structural height of the drive device low. Like the driven pinion, the deflection rollers are preferably provided with toothing in which the internal toothing of the toothed belt engages.

In a further development of the drive device, the tension of the toothed belts may be adjusted in each case by means of a tensioning device. These tensioning devices are preferably in active connection with the deflection rollers. It is expedient for the deflection rollers to be mounted rotatably on fixable tensioning slides. The tensioning slides may however also be permanently spring-loaded for tensioning of the toothed belts.

The guide components on each of the two cover sides are in driving connection in each case with one of the toothed belts for driving the cover, so that the cover may be simultaneously and synchronously driven on both sides. The driving connection between the toothed belts and the guide components may be achieved in each case by the engagement between the internal toothing and a correspondingly profiled driving member fixed to the guide component.

The toothed belts may exhibit the cross-sectional shape of a flat rectangle, having longer edges which form the inside or the outside of the toothed belts. A toothed belt width of approximately 4 mm, corresponding approximately to the height or thickness of the pinion in some of the embodiments, is sufficient for the purposes of the present invention, thereby contributing to an advantageously small structural height of the drive device. To construct toothed belts which exhibit good flexibility and which exhibit sufficient tensile strength to transmit forces of approximately 400 N per cover side, a plurality of embodiments are available. For example, the toothed belts may be made from a toothed plastics band or a link chain.

A readily bendable, tensile stress-resistant insert may be molded continuously into the plastics band. The tensile stress-resistant insert may be a metal band or rope resistant to fatigue under reversed bending stresses. The insert may be embedded by injection-molding in the plastics, which also forms the internal toothing.

In a further development of the present concept, all the functional components of the drive device, such as toothed belts, pinions, deflection elements and tensioning device, are attached to a guide frame of the sliding sunroof construction, such that, even before installation on the motor vehicle, a functional, ready-to-install module is available, wherein the electromotive drive may optionally also already be attached to the guide frame.

The toothed belts may advantageously be guided in guide channels which are provided on the guide frame. In the configuration of the guide channels, attention must be paid to the need for the driving members to be able to engage with the toothed belts in the cover movement area and to the toothed belt installation requirements.

In the interests of achieving an optimum coefficient of friction for the toothed belts relative to the wall surfaces of the guide channels, the wall surfaces may be formed in a particular way as a function of the material of the toothed belts and/or the surface condition thereof, be it through an appropriate material pairing and/or an appropriate surface coating for the wall surfaces.

The invention permits both joint drive of both toothed belts by means of one driven pinion and the association of a driven pinion with each toothed belt, wherein, in the latter case, the following embodiment alternatives are preferred for the synchronous running required. Namely, a common electric gear may be provided for both toothed belts, which motor is connected via two drive shafts with the two rotatable toothed pinions in each case via an angular gear arrangement. Alternatively, an electric motor may be provided for each of the two rotatable toothed pinions and is connected via an angular gear arrangement with the relevant pinion, wherein the two electric motors are run in synchronised manner.

BRIEF DESCRIPTION OF THE DRAWINGS

For a better understanding of the invention and to show how the same may be carried into effect, reference will now be made, by way of example, to the accompanying drawings—in which:

FIG. 3A is a view similar to FIG. 3 showing an embodiment including a chain, FIG. 5 shows a broken-away, partially sectional detail of the rear end of a lateral part of the guide frame, with a deflection roller and a tensioning device, as defined by the circle V in FIG. 1, FIG. 6 shows a section through the arrangement illustrated in FIG. 5, along section line VI—VI of FIG. 5, FIG. 6A shows a sectional view similar to FIG. 6 of an alternative embodiment having a reinforcement member within a belt, FIG. 9 is a plan view of a guide frame of a sliding sunroof, with cover and a second embodiment of the drive device, in which each of the two toothed belts has its own drive, FIG. 10 is a rear view of the arrangement shown in FIG. 9.

DESCRIPTION OF THE PREFERRED EMBODIMENTS

Figure 2:
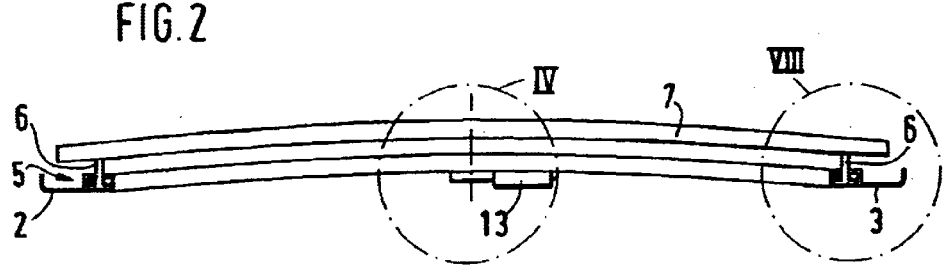
FIG. 2 is a rear view of the arrangement shown in FIG. 1.
Figure 1:
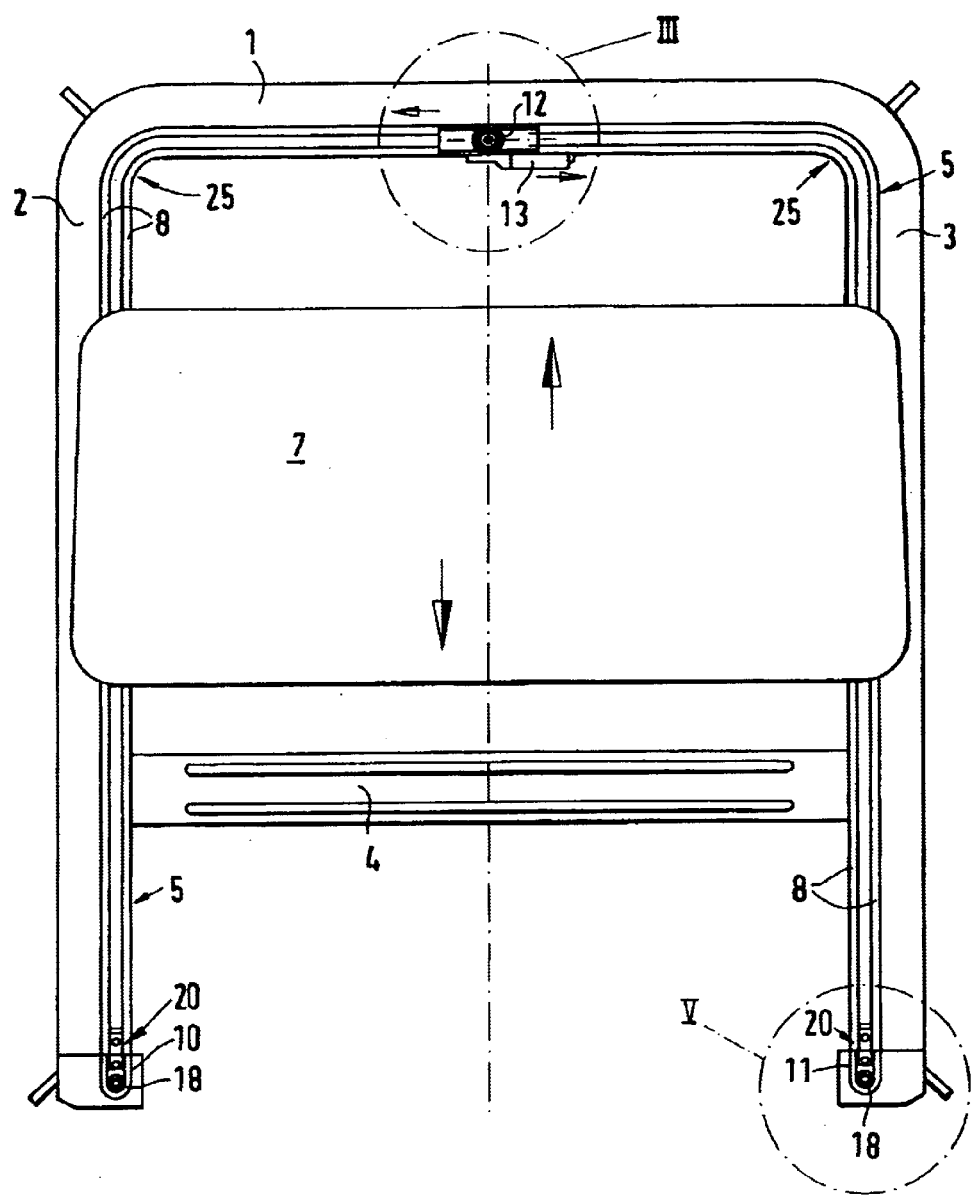
FIG. 1 is a plan view of a guide frame of a sliding sunroof, with cover and a first embodiment of the drive device.
Figure 8:
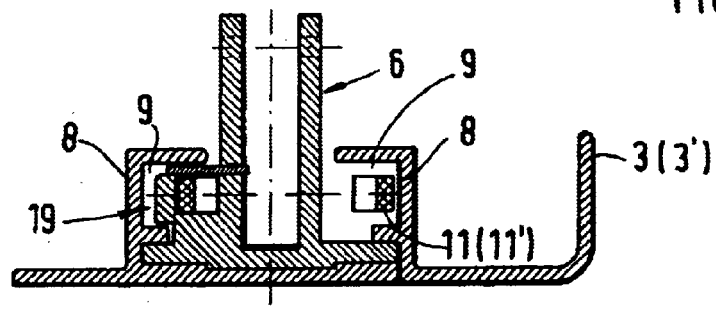
FIG. 8 shows a section through the arrangement illustrated in FIG. 7.
Figure 7:
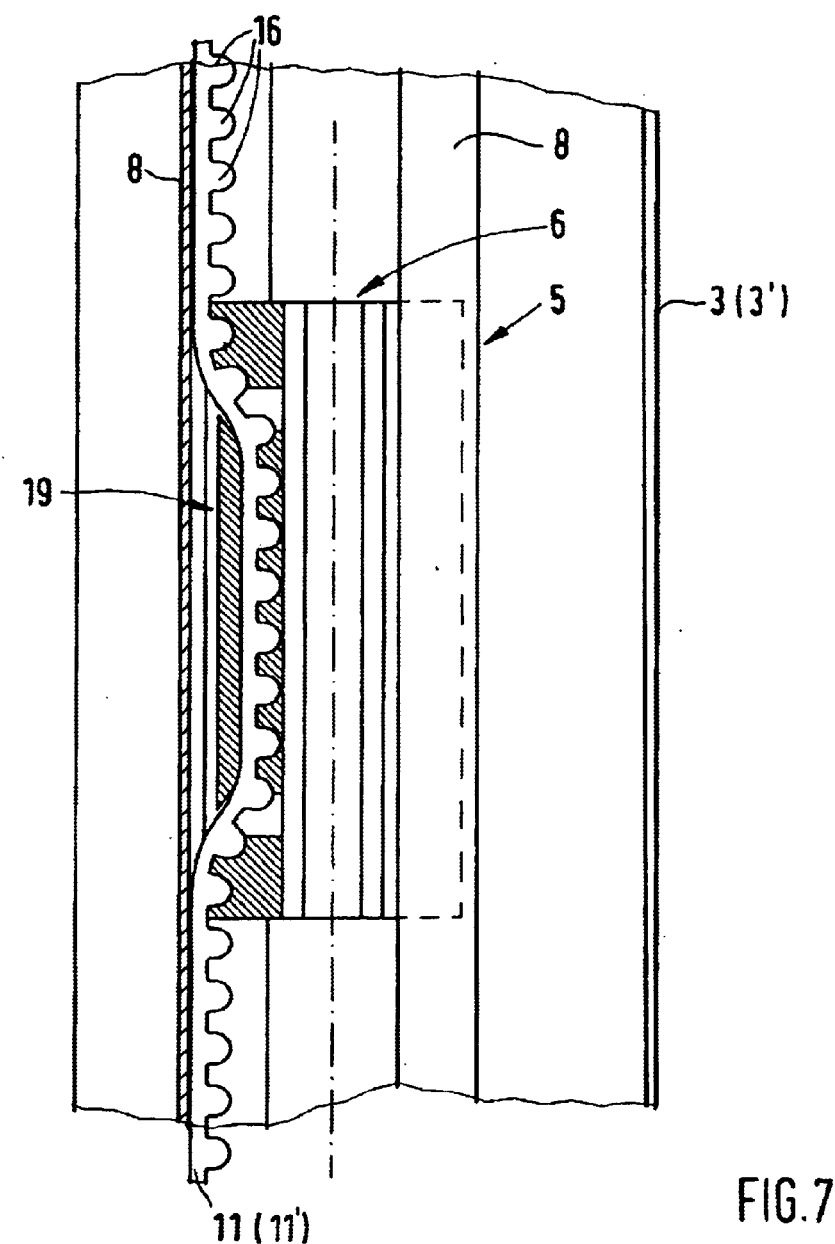
FIG. 7 is a partially sectional plan view of a broken-away lateral part of the guide frame, with a guide component and the driving connection between this guide component and a toothed belt.

The modular pre-assembled guide frame illustrated in FIG. 1, which is intended for attachment to a motor vehicle roof (not shown) provided with a roof opening, consists substantially of a front frame crosspiece 1, two lateral frame parts 2 and 3 and optionally a central transverse profile 4 bracing the lateral frame parts 2, 3 relative to one another. The frame parts 1, 2, 3 form in the illustrated example a one-piece profiled guide frame with a molded-on guide rail 5 extending round over the three frame parts. In the area of the lateral frame parts 2, 3, the guide rail 5, the profile of which is clear from FIG. 6 for example, serves in sliding guidance of guide components 6, one of which is shown in FIGS. 7 and 8 and which are indicated in FIGS. 2 and 10. In accordance with their function, which will not be described in any more detail here, the guide components 6 are connected with the cover 7 for displacement thereof.

For a more detailed explanation of the first embodiment of the drive device, reference will now be made to FIG. 1 together with FIGS. 3, 4, 6 and 8. As may best be seen from FIG. 6, the guide rail 5 comprises two mutually spaced, cross-sectionally E-shaped profile projections 8, which extend in parallel with one another, as illustrated in FIG. 1. The upper two opposing profile cavities form guide channels 9 for the two toothed belts 10 and 11 displaceable therein, to be explained in more detail. The lower two opposing guide channels, not described in any more detail, serve in guiding the guide components 6. While the guide channels 9 on the lateral frame parts 2, 3 in the area of movement of the cover 7 are approximately U-shaped and face one another in open manner, the guide channels 9 on the front frame crosspiece 1 may be substantially closed, as is clear from FIG. 3.

Figure 3:
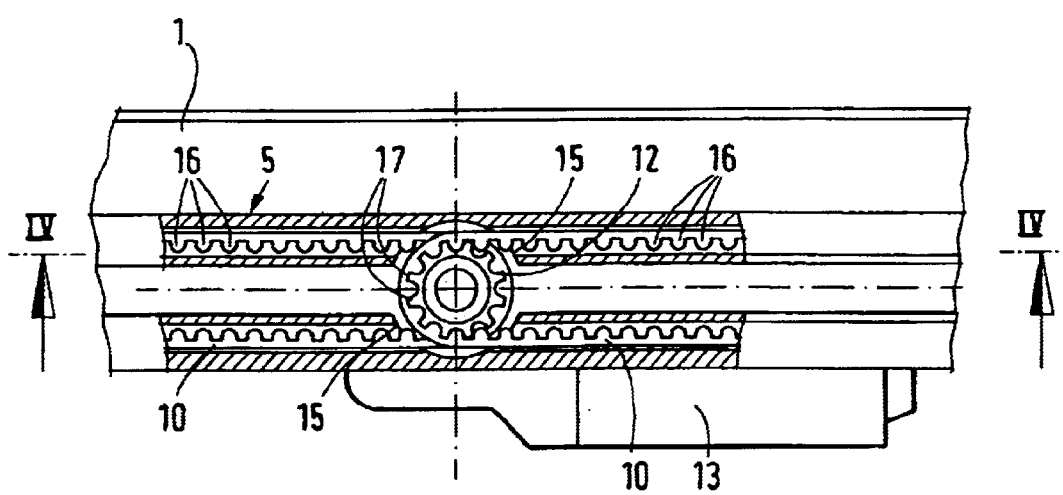
FIG. 3 shows a broken-away, partially sectional detail of the guide frame and the drive device with a common drive pinion for the two toothed belts, as defined by the circle III in FIG. 1.

Approximately in the center of the frame crosspiece 1 there is located the pinion 12 of the drive device, which, in the example illustrated, may be driven in both directions of rotation by an electric gear motor 13, which is attached to the frame crosspiece 1 from below. The pinion 12 is located centrally between the two guide channels 9 and may be introduced from above via its drive shaft 14 and coupled non-rotatably with the electric gear motor 13. At the point of engagement between the pinion 12 and the toothed belt 10, 11, recesses 15 are milled into the opposing walls of the profile projections 8 to open up the guide channels 9 (FIG. 3).

The endless, tensile stress-resistant toothed belts 10, 11 forming the drive transmission elements are provided on the inside with internal toothing 16, which is complementary to the toothing 17 of the pinion 12. Toothed belts 10, 11 and pinion 12 are provided with matching spur toothing. As may be seen from FIG. 6, which illustrates one of the toothed belts 11 by way of example, the toothed belts substantially exhibit the cross-sectional shape of a flat rectangle, the longer edges of which form the toothed inside or outside of the toothed belts 10, 11.

The example of FIG. 3A shows an alternative arrangement having a linked chain 10'. FIG. 6A shows another alternative arrangement where a belt has a bendable, tensile, stress-resistant insert 50. In this example, the insert 50 is molded continuously into a plastic band.

At the ends of the two lateral frame parts 2, 3, the two toothed belts 10, 11 are each deflected about a deflection element, which in the example illustrated is a rotatably mounted deflection roller 18 toothed to match the pinion 12 (FIG. 5).

The driving connection between the two toothed belts 10, 11 and the guide components 6 is obtained on each side of the cover 7 in each case by the engagement between the internal toothing 16 and a correspondingly toothed driving member 19 attached to the guide component 6.

The tension of the two toothed belts 10, 11 may be adjusted in each case by means of a tensioning device 20 supported on the guide frame of the sliding sunroof construction, which tensioning device 20 is illustrated with reference to the example of the toothed belt 11 in FIGS. 5, 6. The tensioning device 20 acts directly on the deflection roller 18. To this end, the tensioning device 20 comprises a tensioning slide 21 guided so as to be displaceable parallel to the two opposing toothed belt portions, which tensioning slide 21 may be fixed relative to the lateral frame part by means of fixing screws 22 once the belt tension has been adjusted. At the end of the tensioning slide 21, the deflection roller 18 is mounted rotatably on a bearing pin 23. The displaceability of the tensioning slide 21 is assisted by an oblong recess 24, through which the fixing screws 22 extend.

As is clear from FIG. 1, the toothed belts 10, 11, the pinion 12 with its electric gear motor 13, the deflection rollers 18 and the tensioning devices 20 are all attached to the guide frame of the sliding sunroof construction.

Figure 4:
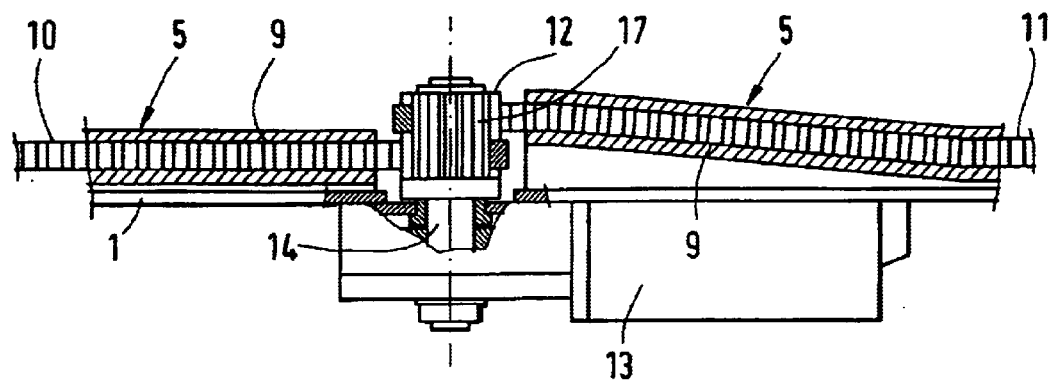
FIG. 4 shows a section through the arrangement illustrated in FIG. 3, along section line IV—IV.

A special feature of the first embodiment of the drive device illustrated in FIGS. 1 to 4 is that the two toothed belts 10, 11 are wrapped partially around the common pinion 12 arranged on the front frame crosspiece 1, in each case around 180° thereof as FIGS. 3 and 4 show. To this end, the toothed belts 10, 11 are guided at different levels in the area of the pinion 12 due to a height offset between the guide channels 9 located on each side of the pinion 12, i.e. they are located directly above one another without coming into contact with one another (FIG. 4). Accordingly, the height of the toothing 17 on the common pinion 12 corresponds to approximately twice the width of the toothed belts 10, 11. After wrapping the common pinion 12, the toothed belts 10, 11 are each guided via a 90° deflection point 25 (FIG. 1) to a lateral frame part 2 or 3 respectively. In this first embodiment of the drive device, the common pinion 12 ensures synchronous drive of the two sides of the cover 7.

In contrast to the illustrated and described first embodiment, the common pinion with its electric gear motor may be provided, in reversed arrangement, on a rear frame crosspiece (not shown) instead of on the front frame crosspiece, such that the structural height of the sliding sunroof construction is reduced considerably in the front area, whereby the headroom in the front of the vehicle interior may be enlarged.

Figure 11:
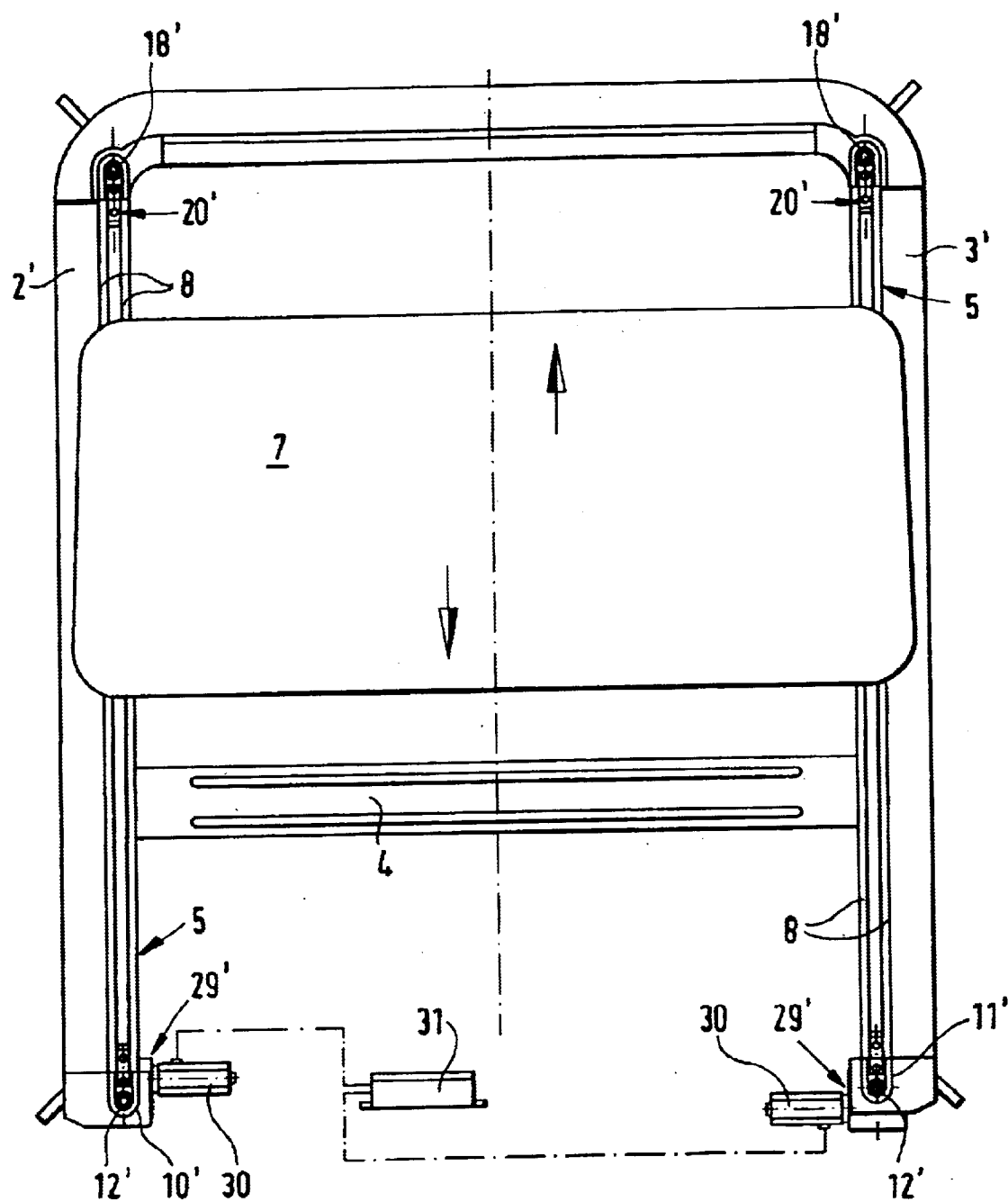
FIG. 11 is a plan view of a guide frame of a sliding sunroof, with cover and a variant of the second embodiment of the drive device.

The second embodiment of the drive device, which is illustrated in FIGS. 9, 10 and in variant form in FIG. 11, differs from the above-described first embodiment substantially in that each of the two toothed belts 10', 11' is guided only on a lateral frame part 2', 3' of the guide frame. The two toothed belts 10', 11' are positioned approximately in parallel and separated from one another approximately by the cover width. Here too, the structural height of the sliding sunroof construction is smaller in the area of the front frame crosspiece 1' and the headroom is therefore correspondingly enlarged.

At one end of each lateral frame part 2', 3', at the rear end in the example shown, the toothed belt 10', 11' is wrapped partially around a driven pinion 12', i.e. over an angle of wrap of 180°, while the toothed belt 10', 11' is guided at the other end, the front end in the example illustrated, of the relevant frame part about a deflection roller 18' equipped with a tensioning device 20'. The deflection rollers 18' and the tensioning devices 20' are constructed as described with reference to the first embodiment.

In the embodiment according to FIGS. 9, 10, a common electric gear motor 26 is provided for both toothed belts 10, 10' and/or for both pinions 12', which electric gear motor 26 is connected with the relevant pinion 12' via two drive shafts 27, 28 and via angular gear arrangements 29 of conventional construction (worm/worm wheel; bevel gear pair) associated therewith. In this way, the two toothed belts 10', 11' for driving the cover are likewise forced into synchronised operation.

In the variant of the second embodiment of the drive device shown in FIG. 11, a comparatively smaller electric motor 30 is provided for each of the two pinions 12', which electric motor 30 is connected with the relevant pinion 12' via a respectively associated angular gear arrangement 29'. The two electric motors 30 are connected with an electronic synchronisation means 31 producing synchronism of the two toothed belts 10', 11'.

In summary, the invention proposes various embodiments of a drive device for motor vehicle sliding sunroofs or the like, in which the drive cables wound with wire in screw thread-like manner used hitherto as drive transmission elements in particular for the drive of the displaceable cover but also for the drive of displaceable shading or wind deflection elements are replaced by endless, tensile stress-resistant, low-noise guided toothed belts.

We claim:

1. A vehicle roof assembly, comprising:
    a roof panel having an opening;
    a cover member that is selectively moveable relative to the opening to selectively close the opening;
    a first belt associated with a driving member near one side of the cover member;
    a second belt associated with a driving member near a second side of the cover member; and
    at least one drive member that engages the belts and rotates each belt about a loop to move the cover relative to the opening, the drive member comprises a pinion and each belt wraps around a portion of the pinion.

2. The assembly of claim 1, wherein each belt wraps approximately 180° around the pinion.

3. The assembly of claim 1, wherein the pinion includes outer teeth and an inner surface on each belt includes cooperating teeth.

4. The assembly of claim 1, including a frame having belt guides and wherein the belt guides have portions directing the respective belts to separate axial positions on the pinion.

5. The assembly of claim 1, wherein the drive member is at one end of a belt loop followed by each belt and including a deflection element at an opposite end of each belt loop.

6. The assembly of claim 5, wherein the deflection elements each comprise a rotatably mounted deflection roller.

7. The assembly of claim 6, wherein the deflection rollers have external teeth and the belts have internal teeth that cooperate with the teeth on the deflection rollers.

8. The assembly of claim 5, including a frame portion and at least one tensioning device supported on the frame portion to selectively adjust a tension of at least one of the belts.

9. The assembly of claim 8, wherein the deflection elements are supported on the tensioning devices.

10. A vehicle roof assembly, comprising:
    a roof panel having an opening;
    a cover member that is selectively moveable relative to the opening to selectively close the opening;
    a first belt associated with a driving member near one side of the cover member;
    a second belt associated with a driving member near a second side of the cover member; and
    at least one drive member that engages the belts and rotates each belt about a loop to move the cover relative to the opening;
    a guide frame with frame cross pieces and lateral frame parts, wherein the drive member comprises one common driven, rotatable toothed pinion supported on one of the frame cross pieces of the guide frame, the toothed pinion being partially wrapped by the two belts at different levels, each of the belts being guided about a deflection element approximately at the end of one of the lateral frame parts, an axial height of the common rotatable toothed pinion corresponding approximately to the combined width of the belts.

11. The assembly of claim 1, including a guide frame having lateral frame parts that extend parallel to the direction of movement of the cover member, wherein each of the belts is guided only along a corresponding one of the lateral frame parts, each belt wrapping partially about a driven pinion near one end of the corresponding lateral frame part and guided about a deflection element near another end of the corresponding lateral frame part.

12. The assembly of claim 11, including at least one electric motor associated with the pinions to cause rotary motion of the pinions and including a synchronizer that synchronizes rotation of the pinions.

13. A drive device for a motor vehicle sliding roof panel, comprising:
    two flexible belts having an inner surface including teeth, one belt being associated with each side of the sliding roof panel; and
    at least one drive member having an externally toothed surface that engages the teeth on the inner surfaces of the belts to synchronously rotate the belts about belt loops in a manner that causes sliding movement of the sliding roof panel.

14. The device of claim 13, wherein the drive member comprises a single pinion at one end of each belt loop and including externally toothed deflection members at opposite ends of the belt loops.

15. The device of claim 14, including a frame and tension adjustment members that rotatably support the deflection members, the tension adjustment members are selectively positioned on the frame to selectively adjust a tension on a corresponding one of the belts.

16. The device of claim 13, wherein the belts each comprise a plastic band, including a tensile, stress-resistant insert molded continuously into each plastic band.

17. The device of claim 16, wherein the insert comprises one of a metal band or rope.

18. The device of claim 13, wherein the belts each comprise a linked chain.

19. The assembly of claim 1, wherein the first and second belts each comprise a chain.

* * * * *